United States Patent [19]

Koenig

[11] 4,396,004
[45] Aug. 2, 1983

[54] VENTING MEANS FOR SOLAR COLLECTORS

[76] Inventor: Robert H. Koenig, 21 Barrington Pl., Huntington Hills, N.Y. 11746

[21] Appl. No.: 246,282

[22] Filed: Mar. 23, 1981

[51] Int. Cl.³ .............................................. F24J 3/02
[52] U.S. Cl. .................................. 126/418; 126/422; 126/450
[58] Field of Search ............... 126/418, 422, 417, 450, 126/428, 429, 432

[56] References Cited

U.S. PATENT DOCUMENTS

| 4,043,317 | 8/1977 | Scharfman | 126/422 |
| 4,150,659 | 4/1979 | Buckley | 126/422 X |
| 4,150,660 | 4/1979 | Peters et al. | 126/450 |
| 4,198,956 | 4/1980 | Solean, Jr. | 126/444 |
| 4,226,225 | 10/1980 | Neidermeyer | 126/422 |
| 4,286,420 | 9/1981 | Pharmakidis | 126/430 |

*Primary Examiner*—Larry Jones
*Attorney, Agent, or Firm*—James P. Malone

[57] ABSTRACT

Venting means for solar collectors of the air flow type. An upper manifold has a gap formed by a top extending over and spaced above the upper end of the collector. An elongated inflatable tube is mounted in the gap, so that when the elastic tube is inflated it seals the collector from the outside air. Similarly, the lower edge of the collector may be closed off with this arrangement. The venting arrangement provides cold weather and warm weather modes of operation.

2 Claims, 3 Drawing Figures

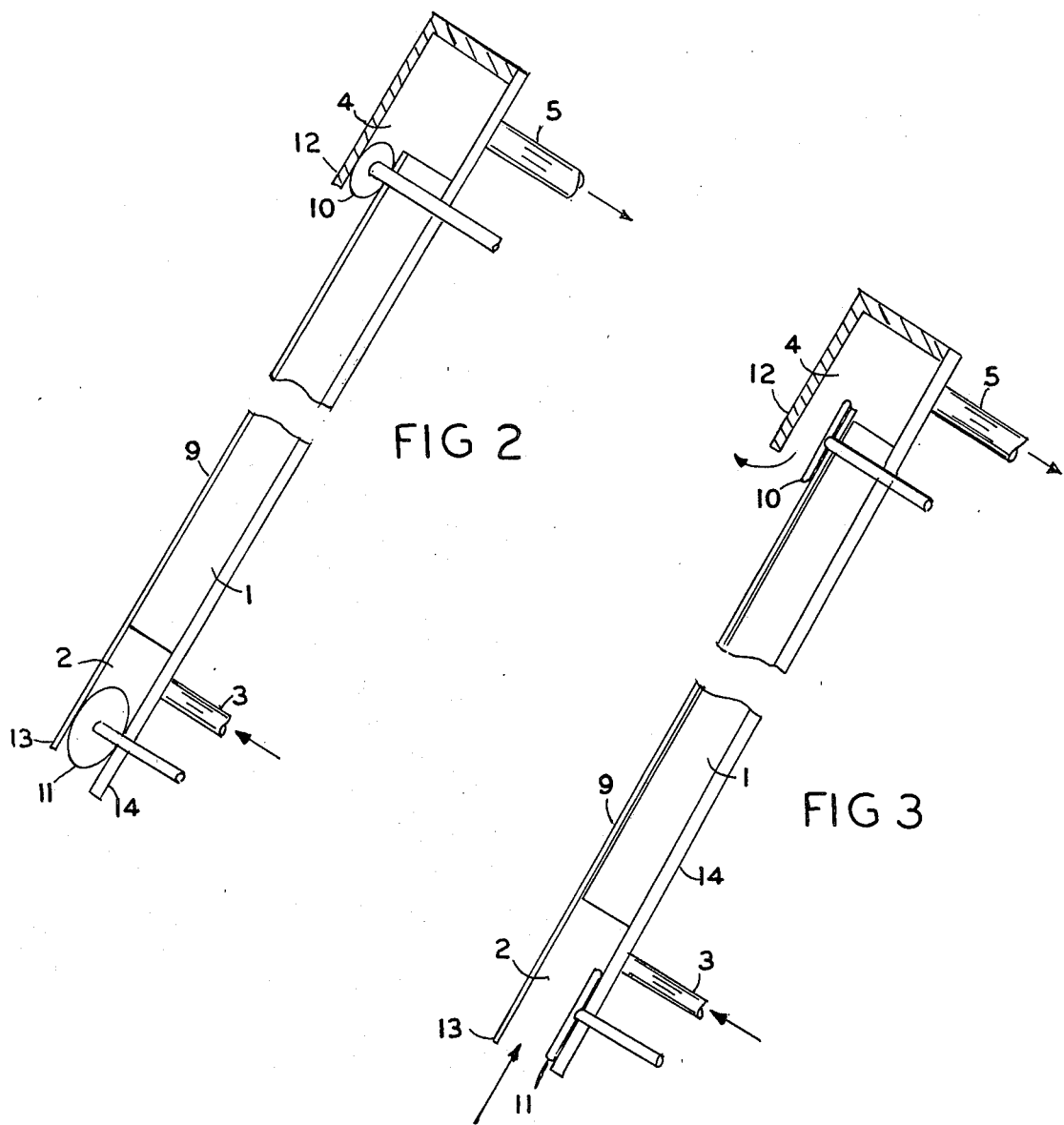

VENTING MEANS FOR SOLAR COLLECTORS

TECHNICAL FIELD

This invention relates to solar collectors and more particularly to venting means for solar collectors of the air flow type.

BACKGROUND ART

Solar collectors generally use liquid to collect and transfer solar heat. This type of solar collectors is subject to leaks, corrosion and freezing. Air flow collectors solve this problem and in addition can be used in the summer for ventilating the building. One trouble with air flow collectors having extended areas is the mechanical difficulty of venting in summer and sealing adequately in winter. This invention solves both difficulties without linkage or hinges.

THE INVENTION

The present invention provides a venting system for solar collectors of the air flow type such as shown in my co-pending application Ser. No. 253,303 filed on Apr. 13, 1981 for SOLAR COLLECTOR MEANS.

The present invention provides an upper manifold for collecting the hot air and a lower manifold for feeding air to the collector. In order to vent the collector properly for summer operation and prevent overheat damage to components, a venting aperture is provided across the full width of the collector at the upper and lower edges. An elongated inflatable sealing tube is mounted between the upper end of the collector and the upper manifold so that when the tube is inflated the venting aperture will be closed from weather. The sealing tube may be connected by a pipe or tubing for inflating remotely by mouth. The inflated sealing tube conforms to the wavy corrugations of the glazing. When the tube is deflated the venting aperture is open across the full width of the collector. In the summer mode of operation, the house may be ventilated and the roof cooled by house air rising through the collector and being ventilated to the atmosphere. The air flow is provided by natural convection in the summer mode of operation.

Similarly the bottom edge may be closed or opened to admit outside air instead of house air for cooling the collector and roof.

OBJECTS OF THE INVENTION

A principal object of the invention is to provide a new and improved venting means of solar collectors of the air flow type.

Another object of the invention is to provide a new and improved venting means for solar collectors which makes the collector suitable for summer mode operation which increases the ventilation of the house and provides cooling of the roof.

Another object of the invention is to provide a new and improved venting and control means which can convert a solar collector of the air flow type from winter to summer modes of operation.

Another object is to provide a new and improved venting means for solar collectors of the air flow type having passages extending from the lower end to the upper end of the collector comprising: an upper manifold having a top extending over and spaced above the upper end of the collector to provide a first venting aperture, a first elongated inflatable tube mounted between the upper top of the collector and the extending top of the manifold so that when the tube is inflated it seals the opening between the upper top of the manifold and the upper end of the collector.

Another object of the invention is to provide effective vents on roof collector operable remotely from the ground.

Another object of the invention is to provide good, effective lightweight venting and closing over extended length.

BRIEF DESCRIPTION OF THE DRAWINGS

These and other objects of the invention will be apparent from the following specification and drawings of which:

FIGS. 2 and 3 are side sectional views illustrating the winter and summer modes of operation.

BEST MODE OF THE INVENTION

Figure 1:
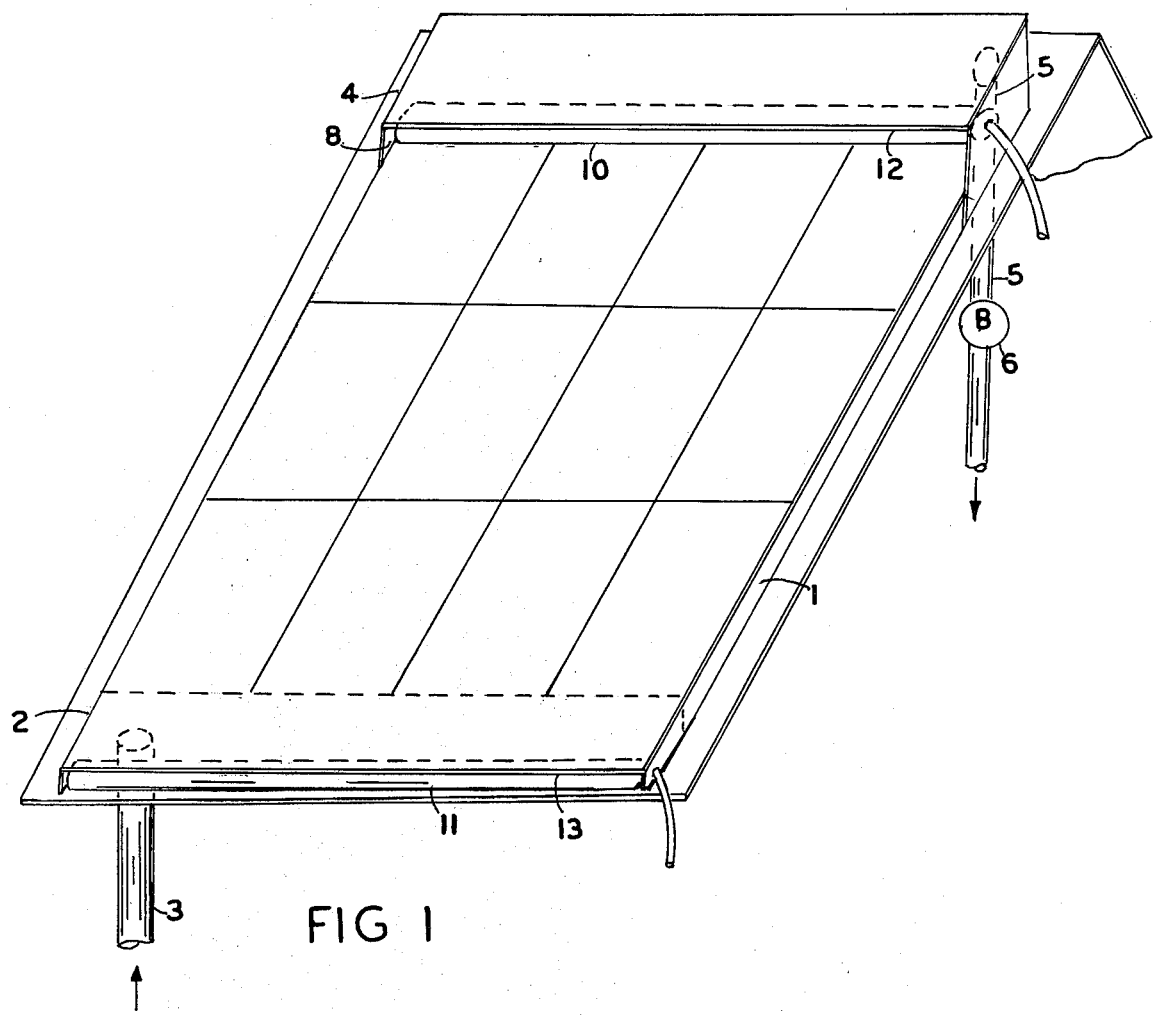
FIG. 1 is a perspective view of an embodiment of the invention.

Referring to the drawings, the venting system of the present invention is utilized with a solar collector 1, of the air flow type which may be as disclosed in my prior co-pending application Ser. No. 253,303 filed Apr. 13, 1981 for SOLAR COLLECTOR MEANS. The collector is preferably mounted in an insulating base 14 on the sunny portion of the roof. A lower manifold 2 connects air from the house through the pipe 3 to the lower end of the collector 1. The collector 1 is covered by clear plastic or glass sheet 9.

An upper manifold 4 collects the air from the upper end of the collector 1.

In the winter or cold weather mode of operation, the heated air is drawn down through the duct 5 by means of the blower 6, into the house. The upper and lower manifolds are sealed or vented by inflatable tubes 10, 11. Air is drawn from the house through duct 3 when tube 11 is inflated and from the atmosphere when tube 11 is deflated.

In the summer or warm weather mode of operation the upper manifold is vented to the atmosphere as will be explained so that the warm air naturally rising through the collector 1 pulls air out of the house and vents it to the atmosphere thereby ventilating and cooling the house as it is also cooling the roof.

FIG. 2 shows side views of the air flow collector and venting system. Air is drawn from the house through the duct 3, up into the collector 1, through the lower manifold 2, which extends across the full width of the collector. The air is heated by the collector 1. The air is then pumped down by the blower 6 and pipe 5 down to the lower portion of the house to provide heating for the house. In this mode of operation the venting aperture 8, which extends across the full width of the collector is closed by means of the inflated sealing tube 10. The lower manifold 2 is also closed by a second sealing tube 11.

In FIG. 3, the summer mode of operation, sealing tube 10 is deflated as shown in view so that the manifold 4 is vented through the extended venting aperture 8.

Two summer warm weather modes of operation are possible. In one mode previously described, the lower sealing tube 11 remains inflated and air is drawn from the house by means of the pipe 3.

However, if desired, the lower sealing tube may also be deflated as shown in FIG. 3. In this event, air will be drawn into the bottom end of the collector from the atmosphere as well as house and will tend to cool the roof and collector.

Both vents are constructed with overhanging ledges 12, 13, to minimize the entrance of rain and snow into the collector. However, if some rain water does get into the collector, it will cause no trouble and will drain out by the duct 3 which is preferably provided with a water collector trap. The sealing tubes seal between the upper ledge and the baseboard 14.

The sealing tubes can be made of weatherpooof thin material as polyurethane, polyester, or ethylene propylene rubber or silicone rubber.

It is claimed:

1. Control means for solar collectors of the air flow type having passages extending from the lower end to the upper end of the collector comprising:

an upper manifold having a top extending over and spaced above the upper end of the collector to provide a first venting aperture, first means to remotely control the air flow in the collector consisting of a first elongated inflatable tube mounted between the upper top of the collector and the extending top of the manifold so that when the tube is inflated it seals from the weather the opening between the upper top of the manifold and the upper end of the collector, a baseboard and a lower manifold section having a top spaced above the baseboard to provide a second venting aperture, second means to remotely control the air flow in the collector consisting of a second elongated inflatable tube mounted between the lower edge of the collector and extends full width so that when the elastic tube is inflated it seals the opening at the lower edge of the manifold and the lower end of the collector.

2. Apparatus as in claim 2 wherein the venting apertures extend across the full width of the collector.

* * * * *